Dec. 6, 1960  E. G. RAPP  2,963,128
SANDWICH-TYPE STRUCTURAL ELEMENT
Filed April 21, 1958  2 Sheets-Sheet 1

Inventor
Edward G. Rapp

Dec. 6, 1960 E. G. RAPP 2,963,128
SANDWICH-TYPE STRUCTURAL ELEMENT
Filed April 21, 1958 2 Sheets-Sheet 2

Inventor
Edward G. Rapp

United States Patent Office 2,963,128
Patented Dec. 6, 1960

2,963,128

SANDWICH-TYPE STRUCTURAL ELEMENT

Edward G. Rapp, Cleveland, Ohio, assignor to Thompson Ramo Wooldridge Inc., a corporation of Ohio Filed Apr. 21, 1958, Ser. No. 729,815

4 Claims. (Cl. 189—34)

The present invention relates to improvements in structural elements, and more particularly relates to a composite multi-layer structural element utilizing shaped material fastened to and enclosed between two flat sheets of outer material to form a composite structural assembly.

Various built-up or composite structural elements have been heretofore proposed for obtaining high strength to weight ratios and obtaining the high strength lightweight characteristics required for certain constructions. Disadvantages have been encountered in elements heretofore used in manufacturing difficulties, expense of production, and adaptability to various applications without the use of special assembly and fastening techniques. Consequently, usage of the built-up or composite type of structural element was limited to special applications where considerations of lightweight and high strength were paramount and production cost and installation difficulties and also operational difficulties were not controlling considerations.

An important application wherein high strength low weight characteristics are required is in the aircraft and missile field. Presently known structures are in many cases becoming obsolete due to increased demands of strength and weight characteristics and especially due to higher operating temperatures resulting from skin friction. A feature of the present invention is the provision of an improved composite or built-up structural element which is arranged to provide flow paths through the structure for improved cooling effects on the material. Another important feature of the invention is the provision of a design which reduces the directional deficiencies that result in low strength properties in either shear or bending stress.

The invention contemplates the provision of a structure including a pair of spaced substantially flat sheet layers positioned to extend in separate parallel planes having longitudinal and lateral dimensions and spaced apart transversely with an intermediate member sandwiched between the sheet layers and formed of a shaped flat sheet formed to have a series of first longitudinally spaced rows of laterally extending accordion pleats which are parallel to each other and with second or intermediate longitudinal rows of accordion pleats which are also parallel to each other but are at an angle to the pleats in said first spaced rows and are individually joined at their ends to individual pleats of said first rows with both rows of pleats being attached to the inner surfaces of the flat sheet layers to form a composite acting structural member.

An object of the present invention is to provide a composite panel formed of structural members which are arranged to have improved internal passages for circulation of cooling fluids to maintain the material at a temperature wherein the strength characteristics will not be impaired.

Another object of the invention is to provide the sandwich type core design for a structure wherein the basic arrangement may be utilized, but the relative positions of elements may be changed to control the stiffness pattern dependent on the load to be encountered.

Another object of the invention is to provide an improved composite structure wherein uniform stiffness in all directions is obtainable.

A still further object of the invention is to provide an improved sandwich structural assembly which is adaptable to improved manufacturing methods and has a low manufacturing cost.

A further object of the invention is to provide an improved sandwich type structural element which is easily handled and which lends itself to high speed production.

A still further object of the invention is to provide a structural element with outer enclosing sheets and with a formed core that is made from a single sheet or strip of material.

Another object of the invention is to provide an improved structure for a composite structural member wherein the ductility of the material is not critical due to obviating the necessity for stretching the material and forming.

A further object of the invention is to provide an improved sandwich type structural element wherein the core material itself can be formed with a configuration that strengthens the material of the core.

Other objects and advantages will become more apparent with the teaching of the principles of the invention in the disclosure of the preferred embodiments thereof in the specification, claims and drawings, in which:

As shown on the drawings.

Figure 1:
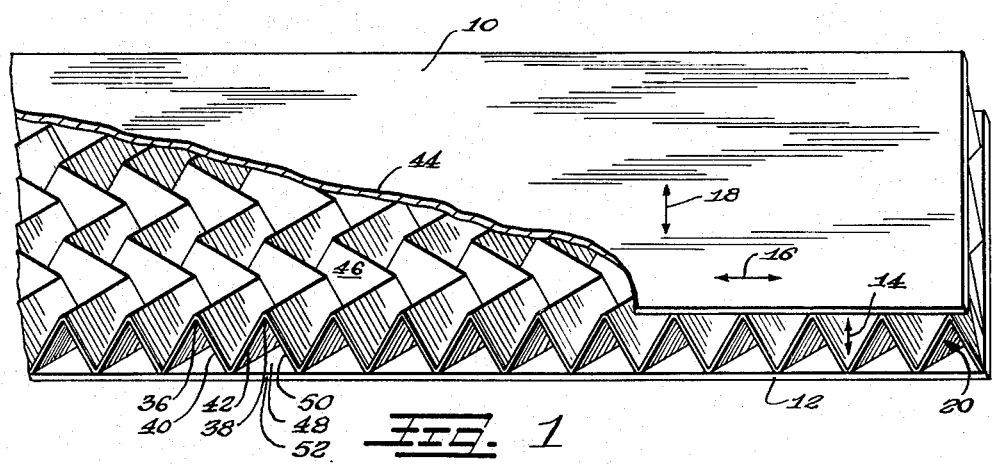
Figure 1 is a perspective view of a sandwich type structural member with a portion of the upper layer broken away for clarity and formed in accordance with the principles of the present invention.
Figure 4:
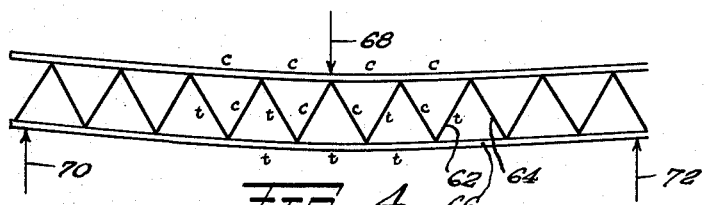
Figure 4 is a side elevational view of the structural assembly looking in a lateral direction.
Figure 5:
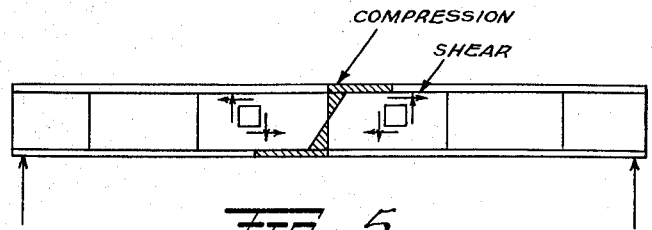
Figure 5 is a front elevational view of the structural assembly looking in a longitudinal direction.

As illustrated particularly in Figures 1, 4 and 5, the unitary structural assembly includes an upper flat sheet or layer 10. For purposes of description, the layer 10 will be described as being the upper sheet, although it will be understood that the composite member may be utilized in any position.

A lower sheet or layer 12 is also provided which is spaced from the upper layer 10 in a transverse direction as indicated by the direction of the arrow 14. The two sheets 10 and 12 extend in parallel planes, and for purposes of description, the planes will be referred to as extending in a longitudinal direction 16, and in a lateral direction 18, as indicated by the arrowed lines.

The sheets or layers 10 and 12 are placed on opposite sides of an intermediate layer or core 20. The core is of substantially uniform thickness throughout so that the sheets 10 and 12 extend in parallel spaced planes. However, it will be understood that for some structural requirements the core 20 may be manufactured so as to be of varying dimensions. For example, one of the upper or lower sheets 10 or 12 may be formed in a curved plane, and the thickness of the core 20 varied so that the core will contact the inner surfaces of both the sheets at all locations.

Figure 2:
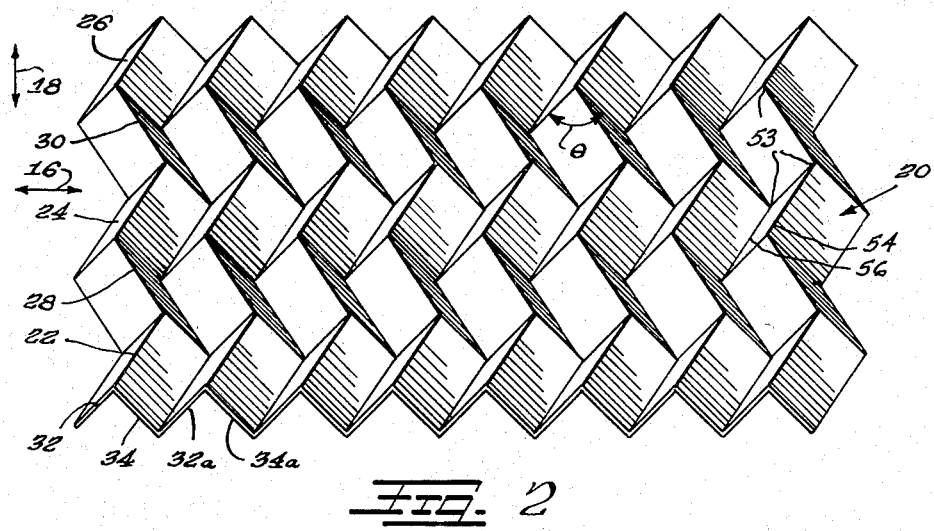
Figure 2 is a perspective view of a core of the member taken alone with the outer layers removed.
Figure 3:
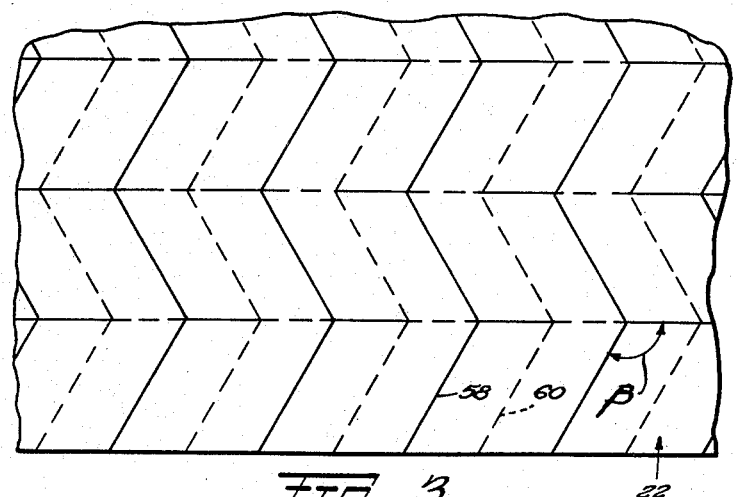
Figure 3 is a plan view of the layout of the core illustrating the manner of bending the core material.

The core is shown in detail particularly in Figures 1, 2 and 3. The core is formed of a flat sheet 22 of material, as shown in Figure 3. The core material may be of a lightweight metal or plastic and the upper and lower layers 10 and 12 of the same or similar material. If formed of plastic, the core will be molded or formed, and if of a metal it may be formed by other methods. For example, if the core material 22 is of sheet material, the strip or sheet may be formed by rolling through progressive die rolls. Another method of forming would incorporate stamping the sheet with progressive dies. A still further method of forming the core from the sheet 22 would embody embossing the sheet to form creases followed by gathering operation to form folds of the correct height. A still further method of manufacture of the core would incorporate hydraulic, pneumatic or vacuum forming over dies to a limited depth followed by gathering to a final depth.

The core structure 20 is formed of a series of accordion-like folds or pleats with the pleats extending in a generally lateral direction as indicated by the arrows 18. The pleats are formed in a zig-zag fashion, and the zig-zags are arranged to form rows of parallel pleats with the rows extending in a longitudinal direction, as indicated by the arrows 16.

The accordion pleats may be considered as being formed in longitudinal rows with the pleats being formed in first spaced rows 22, 24 and 26 positioned on either side of second or intermediate rows 28 and 30. The individual pleats of each of the rows are parallel to each other with the rows extending in the longitudinal direction 16. Each of the pleats in a row is preferably of the same length and each of the rows are of the same length.

The ends of the pleats of each of the rows are joined to the ends of the pleats of the adjacent rows with the pleats of the various rows being the same distance apart in a longitudinal direction. The pleats across the rows are positioned at an angle to each other in the lateral direction 18. It will be seen from viewing Figures 1, 2 and 3 that the pleats arrange themselves in a herringbone pattern.

Considering the construction of each of the pleats, the pleats of the row 22 may be considered to be formed of diverging walls 32 and 34 which meet along a straight line coincident with the line along which the walls join the upper sheet 10. The walls 32 and 34 diverge downwardly to join the lower sheet 12 along the straight line. The walls are arranged in diverging pairs as indicated by the sequential pairs 32, 34 and 32a, 34a. The adjacent walls of adjacent pleats diverge in an upwardly facing direction as indicated by the adjacent walls 34 and 32a. The walls meet along a straight line coincident with the line of engagement of the walls with the lower layer 12 and from that straight line diverge upwardly.

The zig-zag arrangement of the connected pleats of adjacent rows forms zig-zag passages or conduits in a lateral direction across the structural member. This is illustrated in Figure 1 by the adjacent zig-zag pleats 36 and 38, the inner walls 40 and 42 of which coact with the portion 44 of the upper sheet to form a laterally extending zig-zag flow conduit 46. Adjacent the flow conduit 46 is another zig-zag parallel flow conduit 48 which is defined between the wall 42 and a wall 50, and which utilizes a portion 52 of the lower sheet 12 to complete the conduit.

The core structure of Figure 2 is illustrated as being slightly stretched out for purposes of illustration. It will be seen that each fold of the pleat or each wall of the pleats joins in a common intersection 53 with three other folds. Each intersection is always formed by the junction of four folds. Further, these folds are not all upward or downward folds, but rather always consist of three upward and one downward fold for an intersection in the valley of the pleats and always consist of three downward and one upward fold for an intersection at the crest of the pleats. The crest of the pleats is illustrated at 54 in Figure 2, and the valley at 56.

The core material is stretched out flat before manufacture, as illustrated in Figure 3, and the folds are represented by connecting lines. The solid lines 58 represent downward folds and the dotted lines 60 represent upward folds. While it is desirable to retain a symmetrical arrangement of folds, there is an infinite choice of angles that may be used to obtain different physical properties of the finished core. Variation in the angle $\beta$, Figure 3, will lead to different herringbone proportions. Also, variations in the amount of the angle $\theta$, Figure 2, during folding will result in different physical properties in the final core.

From the above discussion it will be seen that a wide variety of proportions can be obtained by simple folding of a flat sheet along the lines illustrated in Figure 3. In manufacturing procedures, these folds can be made from a flat sheet by various methods including those above described. It is to be especially noted that the folding can be obtained by the variety of methods referred to without stretching of the metal foil or other material from which the core may be manufactured.

The core 20 in its final gathered form can be easily held to a sufficiently close tolerance to permit joining of the core to the upper and lower sheets 10 and 12 by various conventional means. Joining can be achieved by high temperature brazing, if a metal is used, or by seam or spot welding. For lower temperature usage, brazing, soldering or attaching by adhesives of high bonding quality will provide the requisite strength. For high temperature applications brazing and welding normally will be necessary.

Figure 7:
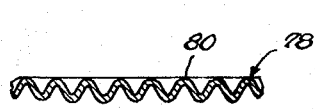
Figure 6:
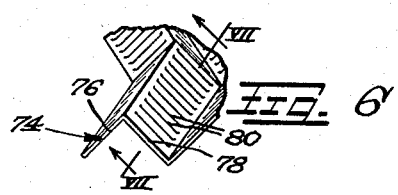
Figure 6 is a perspective view of a core of another embodiment of the invention; and, Figure 7 is an enlarged sectional view taken along line VII—VII of Figure 6.

As illustrated in Figure 6, the material of the core may itself be strengthened. In Figure 6, a core 74 is shown having the same herringbone arrangement as the core of Figures 1 through 5. Each of the walls such as 76 and 78 is formed with the materials provided with beads 80, Figure 7. The beads may take various forms such as ridges for strengthening the material. This may be accomplished by corrugating the material before or after forming. The beads or ridges may run in directions other than that indicated by the beads 80, depending upon the strength properties desired.

Various types of construction material for the core and sheets may be employed. Stainless steel provides a structure of excellent strength qualities and possesses resistance to corrosive agents. Other materials such as paper, various metals, plastic and wood products adapt themselves readily to the principles of the invention and these materials permit a wide variety of applications for use. The strength of the unitary composite sandwich structure depends in part upon the ability to withstand the shear loading imposed upon the core by bending of the panel. Actually, there are two types of core resistance to be considered.

The first stressed condition possible consists of shear stresses in the plane of the core sections. The second stress condition possible consists of compression and tensile stresses in the plane of the core sections. These can also be caused by loads normal to the faces of the structure. The mode that actually exists in the material of the core is the combination of the two, with a portion of each determined by the relative stiffness of the two modes which may be referred to as the compatability conditions.

As illustrated in Figure 4, a cross-section through a composite structure formed in accordance with the present invention reveals that a truss-type of structure results from the triangle formed by two adjacent walls or sides, such as 62 and 64, and on a third side by a section of the sheet of the structure illusrtated at 66. Beam load indicated by the arrow 68, wherein the beam is supported by supports indicated by the arrows 70 and 72, results in compressive loads in some core sections $c$, and tensile loads in other core sections $t$. The skin of the structure or in other words, the upper end layers may be in tension or compression depending upon the direction of bending.

It can be seen that the possibility of buckling exists from the compressive stresses present in the core. In the instance where a straight corrugated core of the type of structure used heretofore is employed, it is apparent that the strength of the corrugated structure is limited by the possibility of compression buckling when bending is in a plane normal to the direction of the corrugation.

Strength in a plane parallel to the plane of the corrugations is enhanced by the greater ability of the core to transmit shear stresses in this plane, as illustrated in Figure 5. Ultimate failure may still be by buckling due to shear, but will occur at a higher loading. The total strength of a structure which employs a simple corrugated core with outer layers of the type heretofore used, is extremely directional and is limited in the weaker direction by a bending movement which results in skin or core buckling in a plane normal to the corrugations.

In a composite structural member formed in accordance with the present invention, however, there is allowed considerably more latitude in designing a structure to give equal strength in all directions. This is because there is no plane which can be passed through the structure of the present invention that will always be normal to the corrugations. Rather, any given plane will intersect some truss-like structures, but there will also be some intersections with walls running more nearly parallel to the intersecting plane. This means that each wall of the core which is under compression is reinforced by an adjacent wall which is loaded in shear, or else shear loads as well as compression loads will be present simultaneously. The tendency toward failure by buckling one section of the core would increase the shear loading in the adjacent section causing this section to support more load. The present invention thereby attains a strength which is intermediate between the maximum strength and the minimum strength of a simple corrugated sandwich type of structure.

Consideration of all the possible bending planes which are normal to the skin or outer sheets of the structure indicates that uniform distribution of strength may result in the proper configuration of the bearing load pattern. It is evident that considerable latitude is available with the present invention, and that controlled directional stiffness may be realized by variations in the herringbone pattern.

It will also be recognized that the present invention allows a core with sufficient flexibility to permit constructing a tapering sandwich panel. This may be achieved by either gradually stretching succeeding rolls of pleats into a thinner core section prior to joining, or by preforming the folds and gradually varying the pattern to give a tapering core rather than one of uniform thickness.

Thus, it will be seen that I have provided an improved unitary composite structural member which meets the objectives and advantages hereinbefore set forth. The structure presents a unitary panel which is well suited to use in aircraft and provides internal flow passages for the improved flow of cooling fluids. As has been described, the stiffness pattern of the structure is controllable and also uniform stiffness in all directions is obtainable.

It will also be recognized that the structure is capable of low manufacturing cost. The structure can employ a single sheet in the manufacture of the core and can utilize the number of production manufacturing processes above referred to. The composite panel is easy to handle, as well as the materials for construction of the panel. Numerous materials may be employed and the ductility of the material is not critical as in other constructions, since the material need not be stretched in forming.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. A structural element comprising a sandwich of two cover sheets and an interposed core sheet integrally secured with the cover sheets, said core sheet being corrugated with the corrugations extending in zig-zag parallel rows and each corrugation having a crest ridge secured to one cover sheet and a valley ridge secured to the other cover sheet, said ridges terminating in a peaked edge so that the core sheet can be formed by folding from a flat sheet without stretching the material, and said corrugations having inclined planar side walls between the crest and valley ridges.

2. A sandwich type structural element comprising spaced opposed cover sheets, a core sheet between said cover sheets, said core sheet being corrugated with the corrugations thereof extending in zig-zag parallel rows defining flow passages through the element, each corrugation having a pair of flat inclined side walls diverging from a crest ridge to spaced parallel valley ridges, said crest ridges each being integrally bonded to one of said cover sheets, said valley ridges and said crest ridges each forming a peaked ridge so that the core sheet can be formed from a flat sheet without stretching the material, each of said valley ridges being integrally bonded to the other of said cover sheets, and the zig-zag rows of corrugations extending continuously from one side edge to the other side edge of said element.

3. A sandwich type structural element composed of three sheets including spaced opposed cover sheets and an interposed corrugated core sheet, said core sheet having the corrugations thereof formed from flat pleats diverging from crest ridges to spaced parallel valley ridges, the corrugations extending in parallel zig-zag rows from one side to the opposite side of the element, the crest ridges of the corrugations being secured to one cover sheet, and the valley ridges of the corrugations being secured to the other cover sheet with each of said ridges forming a peak.

4. A sandwich type structural element composed of three sheets including spaced opposed substantially flat cover sheets and an interposed corrugated core sheet in bonded relation with the cover sheets, said core sheet having the corrugations thereof extending in parallel zig-zag rows with each row composed of two inclined flat pleats diverging from a crest ridge to spaced parallel valley ridges, each pleat having embossed spaced parallel ridges extending between the crest and valley ridges thereof to rigidify the pleats, each of said ridges forming a peak and each of said crest ridges being integrally bonded to one cover sheet, and each of said valley ridges being integrally bonded to the other cover sheet.

References Cited in the file of this patent

UNITED STATES PATENTS

| | | |
|---|---|---|
| 2,233,592 | Dunajeff | Mar. 4, 1941 |
| 2,575,758 | Herd | Nov. 20, 1951 |
| 2,858,247 | De Swart | Oct. 28, 1958 |

FOREIGN PATENTS

| | | |
|---|---|---|
| 776,649 | France | Nov. 8, 1934 |
| 343,031 | Italy | Sept. 8, 1936 |
| 1,001,639 | France | Oct. 24, 1951 |